No. 723,265. PATENTED MAR. 24, 1903.
C. GEBERS.
RAILWAY WAGON COUPLING.
APPLICATION FILED NOV. 19, 1902.
NO MODEL.
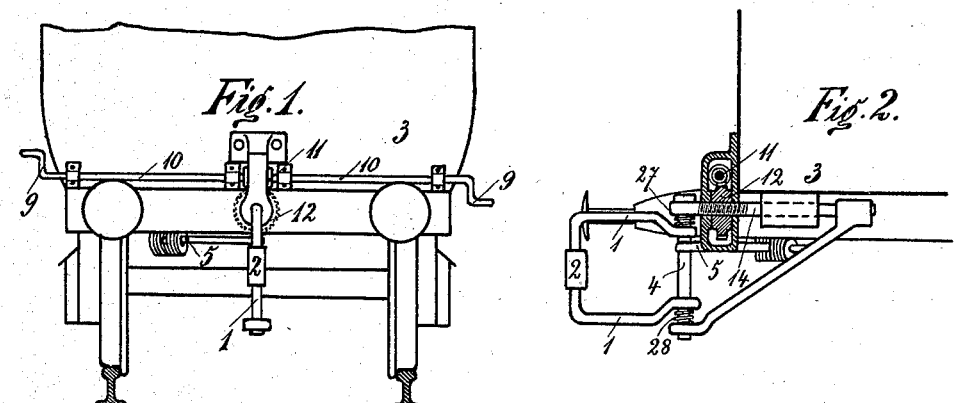
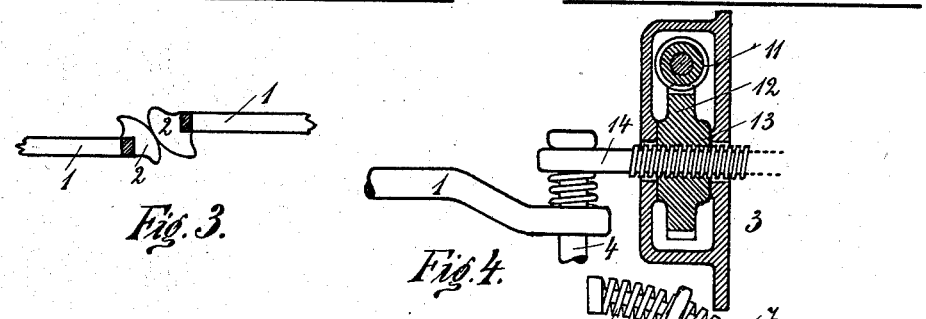
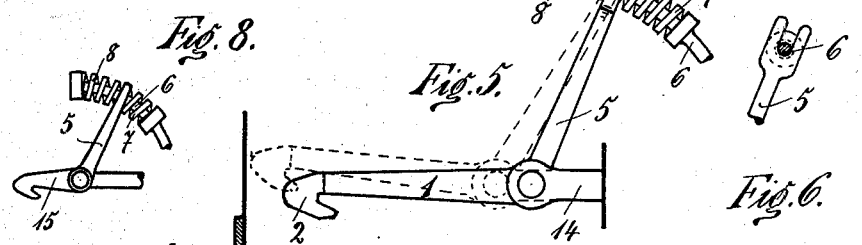
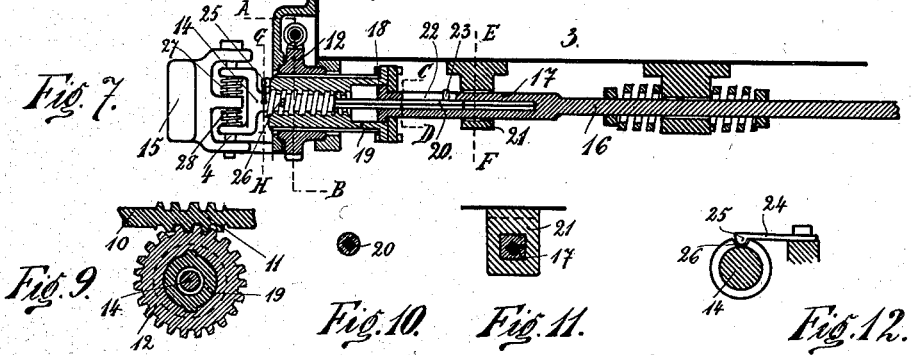
Witnesses
E. Hanusch
L. Waldman
Inventor
Carl Gebers
by B. Singer atty.

UNITED STATES PATENT OFFICE.

CARL GEBERS, OF WANDSBECK, GERMANY.

RAILWAY-WAGON COUPLING.

SPECIFICATION forming part of Letters Patent No. 723,265, dated March 24, 1903.

Application filed November 19, 1902. Serial No. 131,961. (No model.)

*To all whom it may concern:*

Be it known that I, CARL GEBERS, machinist, of 28 Friedrichstrasse, Wandsbeck, Kreis Wandsbeck, in the Province of Schleswig-Holstein, Kingdom of Prussia, Empire of Germany, have invented new and useful Improvements Relating to Railway-Wagon Couplings, (for which patent applications are made in Germany, dated May 28, 1902, and Great Britain, dated October 28, 1902,) of which the following is a specification.

This invention relates to improvements in railway-wagon couplings, and two constructional forms of couplings in accordance with the invention are illustrated in the accompanying drawings.

The object of the invention is to provide an automatic coupling, which will further permit, when the coupling has taken place, of drawing the two wagons close together to the same extent as has hitherto been usually done by means of the known form of spindle as is prescribed for express-trains. Uncoupling is effected by hand without it being necessary, however, for the shunter to get between the wagons to be uncoupled. Both the coupling and uncoupling may be effected from off the track.

In Figure 1 of the accompanying drawings a railway-wagon provided with my improved coupling device is illustrated in end elevation. Fig. 2 shows the coupling in side elevation. Fig. 3 represents the coupling-hooks of two wagons encountering each other immediately prior to coupling. Fig. 4 illustrates the movement of the coupling-hooks. Fig. 5 shows the manner of their positive disengagement in uncoupling. Fig. 6 illustrates the guide for the arm of the coupling-hook. Fig. 7 represents a modified form of the device in which a continuous draw member is provided, the coupling-hook being obliquely formed. Fig. 8 is a view of the coupling-hook. Fig. 9 is a cross-section on the line A B. Fig. 10 is a cross-section on the line C D. Fig. 11 is a cross-section on the line E F, and Fig. 12 is a cross-section on the line G H of Fig. 7.

The coupling consists of a frame 1 and hook 2. The frame 1 is mounted at the end of the wagon 3 in such a manner as to be capable of oscillating around a vertical pivot 4. The frame and its hook are normally maintained in a position exactly at right angles to the wagon end by means of an arm 5, sliding upon a curved bar 6, and maintained in place between two springs 7 and 8.

When it is desired to couple two wagons together, the hooks 2 2 of the respective couplings encounter each other, or when the wagons are loaded to a different degree and the hooks slide past each other the hook of the one part will encounter the vertical front portion of the frame of the other part, and the two couplings are pressed apart. The arm 5 then presses against the spring 7, and owing to this spring the hooks yield, so that as soon as they have passed each other they immediately resume their normal position and securely engage one with the other.

By means of one of the worm-wheels 11, mounted upon the shaft 10 and actuated by the lever 9, the toothed wheel 12 is rotated. The hub 13 of this wheel serves as a nut for a screw-spindle 14, upon the front extremity of which the coupling-frame 1 is fixed. By the rotation of this toothed wheel 12 the whole frame is displaced after coupling has been effected in the direction of the wagon 3, so that the two wagons are drawn together until the buffers lie as closely together as desired.

When uncoupling is to be effected, the spindle 14 is advanced by means of the crank 9 and nut and wheel 12 13. The arm 5 then encounters resistance from the spring 8, and upon further displacing the spindle 14 the frame 1 is displaced laterally until it occupies the position indicated in dotted lines in Fig. 5, whereupon the hook of this portion of the coupling is released from that of the other portion.

In order to permit of a certain amount of lateral play in the coupling in rounding curves, springs are provided upon either side of the arm 5.

If a curve, the center of which may be assumed to lie on the upper edge of the drawing, necessitates a movement of the coupling members, the arm 5 will act upon the spring 7. If the curve is in the opposite direction, the action would be against the spring 8.

In Fig. 7 a coupling-hook 15 is shown, which merely consists of a laterally-formed hook capable of oscillating around a vertical pivot without a frame. This form of hook is also provided with the lateral arm 5, which is adapted to act upon the springs 7 and 8. For the purpose of advancing or drawing back the hook a continuous draw member is provided. With this object the draw-bar 16, situated beneath the wagon 3, is formed with a thickened extremity 17 and a collar 18. This collar is lodged within a sleeve 19, which is capable of turning upon the former, and is also adapted to slide to and fro in the wheel 12, but at the same time participates in the rotation of this wheel, because the sleeve and the wheel are connected by means of a longitudinal groove and feather. If, therefore, the wheel 12 is rotated, the hook will move backward or forward in the manner already described, because the sleeve 19, acting as a nut for the spindle 14, displaces this latter forward or backward, while the entire draw member is capable of displacement in the longitudinal direction as soon as there arises a difference between the tractive effort and the movement of the wagon. The prolongation 20 of the spindle 14 is of rectangular cross-section and fits in a passage of similar cross-section in the thickened portion, while this thickened portion and its guide are also rectangular, thus securing the hook 15 in position. A striking pin or stop 23, inserted in a slot 22, limits the movement of the spindle 14 in the longitudinal direction, while a spring 24 fits with its nose 25 into a recess 26 of a screw-thread on the spindle 14 as soon as the hook 15 has attained its normal position—that is to say, that position in which it is capable of engagement with a hook occupying a like position.

Springs 27 28 render the coupling-hooks yielding in the vertical direction, so as to allow for the upward and downward jolting of the wagons, which takes place in the running of a train.

What I claim as my invention, and desire to secure by Letters Patent, is—

1. In a railway-wagon coupling, the combination of a laterally-yielding coupling-hook, a vertical spindle upon which said hook is mounted, a threaded rod carrying said spindle, a tapped worm-wheel engaging said threaded rod, a worm engaging said worm-wheel and means for manually turning said worm.

2. In a railway-wagon coupling, the combination of a coupling-hook, a vertical spindle on which said hook is pivoted, a lateral arm on said hook, springs engaging the extremity of said arm, means for moving said vertical spindle longitudinally of the wagon whereby the hook will be caused to swing on its pivot substantially as described.

3. In combination, a laterally-yielding coupling-hook mounted on a threaded rod, a nut engaging said threaded rod, a continuous draw-bar having a flange engaging said nut, a worm-wheel engaging said nut and adapted to revolve it, a worm engaging said worm-wheel, means for turning said worm and means for preventing the rotation of the threaded rod, substantially as described.

In testimony whereof I affix my signature in presence of two witnesses.

CARL GEBERS.

Witnesses:
E. H. L. MUMMENHOFF,
OTTO W. HELLMICH.